(12) United States Patent
Bergen

US008682073B2

(10) Patent No.: US 8,682,073 B2
(45) Date of Patent: Mar. 25, 2014

(54) METHOD OF PUPIL SEGMENTATION

(75) Inventor: James Russell Bergen, Princeton, NJ (US)

(73) Assignee: SRI International, Menlo Park, CA (US)

( * ) Notice: Subject to any disclaimer, the term of this patent is extended or adjusted under 35 U.S.C. 154(b) by 329 days.

(21) Appl. No.: 13/096,716

(22) Filed: Apr. 28, 2011

(65) Prior Publication Data
US 2012/0275664 A1  Nov. 1, 2012

(51) Int. Cl.
*G06K 9/34* (2006.01)

(52) U.S. Cl.
USPC .......................................... 382/173; 382/117

(58) Field of Classification Search
USPC ................. 382/115–118, 173, 284, 165, 108; 902/3, 6; 340/5.53, 5.83; 348/78, 161; 713/186
See application file for complete search history.

(56) References Cited

U.S. PATENT DOCUMENTS

| | | | |
|---|---|---|---|
| 5,291,560 A | 3/1994 | Daugman | |
| 5,572,596 A | 11/1996 | Wildes et al. | |
| 6,144,754 A | 11/2000 | Okano et al. | |
| 6,542,624 B1 * | 4/2003 | Oda | 382/117 |
| 6,614,919 B1 | 9/2003 | Suzaki et al. | |
| 7,583,823 B2 * | 9/2009 | Jones et al. | 382/117 |
| 8,170,293 B2 * | 5/2012 | Tosa et al. | 382/117 |
| 8,189,879 B2 * | 5/2012 | Cambier | 382/117 |
| 8,374,404 B2 * | 2/2013 | Williams et al. | 382/117 |
| 2005/0210267 A1 | 9/2005 | Sugano et al. | |
| 2006/0120570 A1 | 6/2006 | Azuma et al. | |
| 2007/0025598 A1 | 2/2007 | Kobayashi et al. | |
| 2007/0140531 A1 | 6/2007 | Hamza | |
| 2009/0208064 A1 | 8/2009 | Cambier | |
| 2010/0046808 A1 * | 2/2010 | Connell et al. | 382/117 |
| 2013/0044199 A1 | 2/2013 | Nanu et al. | |

FOREIGN PATENT DOCUMENTS

EP   0 821 912   9/2003

OTHER PUBLICATIONS

Bertalmio et al., "Navier-Sokes, Fluid Dynamics, and Image and Video Inpainting", Computer Vision and Pattern Recognition, Proceedings of the 2001 IEEE Computer Society Conference, 2001, pp. I-355-I-362, vol. 1.
Daugman, "How Iris Recognition Works", IEEE Transactions on Circuits and Systems for Video Technology, Jan. 2004, pp. 21-30, vol. 14, No. 1.
Roth, Larry, "Mouthpiece Meditations, Part 3", Mar. 6, 2001, www.trombone.org, Online Trombone Journal, 8 pages.
Waybackmachine citation for Roth, Larry, "Mouthpiece Meditations, Part 3", Mar. 6, 2001, www.trombone.org., Online Trombone Journal, 8 pages.

* cited by examiner

*Primary Examiner* — Ishrat I Sherali

(57) ABSTRACT

A method of pupil segmentation in a digital image of a vertebrate eye, said image being an intensity image composed of pixels having each a specific intensity value, the method comprising the steps of:
  deriving a texture image from the intensity image, said texture image being composed of pixels having each a specific contrast value;
  forming a combined image by point-wise combining the intensity image with the texture image,
  identifying a set of pixels in the combined image which fulfill a combined low-intensity and low-contrast criterion; and
  approximating a boundary of said set by a convex curve and taking said convex curve as a boundary of the pupil.

19 Claims, 9 Drawing Sheets

METHOD OF PUPIL SEGMENTATION

BACKGROUND OF THE INVENTION

1. Field of the Invention

The invention relates to a method of pupil segmentation in a digital image of a vertebrate eye. The term "vertebrate" shall be understood to include humans.

2. Description of Background Art

A method of this type is used in the context of biometric identification systems based on iris analysis.

A biometric personal identification system based on iris analysis has been described by John G. Daugman in U.S. Pat. No. 5,291,560 and in J. G. Daugman: "How Iris Recognition Works", IEEE Transactions on Circuits and Systems for Video Technology, Vol. 14, no. 1, pp. 21-30, January 2004.

Such identification systems take advantage of the fact that the iris of the eye of an individual, which may be a human or a vertebrate, has a characteristic pattern that is unique for that particular individual, so that an iris analysis may be used for uniquely identifying the individual. To that end, an image of an eye of the individual is captured with a digital camera, and image processing algorithms are used for recognizing the pupil and the iris of the eye in the digital image. Then, the iris pattern is normalized so as to compensate the effect of varying dilation or contraction of pupil, and a filter procedure is employed for transforming the normalized image of the iris into a digital code, a so-called iris code, that is unique to the individual and may therefore be used for identification purposes.

Once an iris code of an individual has been created and stored, that individual may be identified by capturing again an image of its eye, creating an iris code on the basis of the new image, and checking the iris code thus obtained against the code that had been stored previously.

EP 0 821 912 B1 describes a pupil segmentation method that is based on the consideration that the pupil of an eye is an area that has a low density and low contrast. The pupil region in the image is therefore determined by extracting a region having a surface area within a range of predetermined threshold values. The result is a pupil area which has an irregularly shaped boundary. This boundary is then approximated by an ellipse which is considered as the boundary of the pupil.

US 2009/0208064 A1 describes a pupil segmentation method wherein a pupil region which may have an irregular shape is determined by extracting a region having an intensity that is lower than a certain threshold and then computing the convex hull of that region.

SUMMARY OF THE INVENTION

It is an object of the invention to provide a pupil segmentation method that can appropriately describe pupil shapes that deviate significantly from a circular or elliptic shape.

This object is achieved with a method of pupil segmentation in a digital image of a vertebrate eye, said image being an intensity image composed of pixels having each a specific intensity value, the method comprising the steps of:

deriving a texture image from the intensity image, said texture image being composed of pixels having each a specific contrast value;

forming a combined image by point-wise combining the intensity image with the texture image, identifying a set of pixels in the combined image which fulfill a combined low-intensity and low-contrast criterion; and approximating a boundary of said set by a convex curve and taking said convex curve as a boundary of the pupil.

The combined low-intensity and low-contrast criterion can characterize the pupil area with high selectivity, so that the pupil area can be delimited from other areas in the image, regardless of the shape of the pupil area.

In this context, "point-wise" means that, for each point of the image, the intensity value is combined with the contrast value of the same point. This does not necessarily mean that the pixel compositions of the intensity image and the contrast image must be identical. For example, a pixel of the contrast image may cover several, e.g. four, pixels of the intensity image. Then, the point-wise combination would result in four pixels of the product image, each pixel corresponding to one of the pixels of the texture image and to which is assigned a combination of the contrast value of that pixel and a common intensity value of all four pixels.

In a preferred embodiment, the combined image is a product image formed by point-wise multiplication of the intensity image with the texture image, and the combined low-intensity and low-contrast criterion is a threshold criterion for the product image.

In an alternative embodiment, there could be two different thresholds, one for the intensity image and one for the texture image, and the combined criterion could consist of deciding that a point is part of the pupil if both the intensity and texture values fall below their respective thresholds. That is, there could be a logical AND of two independent tests of the two properties rather than a test of the combined measure. It would also be possible construct a combined measure with a binary operation other than a product. For example, one could add the two measures, or one could apply compressive or accelerating nonlinearities, or thresholds or clipping to the values before adding them. In the case where these nonlinearities correspond to a logarithmic function the result would be essentially equivalent to the embodiment using the product image. Thus, it is in fact possible to construct a continuum of ways of combining the two measures that has the product as a special case. These alternative embodiments may be useful in i situations in which it is desired to de-emphasize the texture (or intensity) measure to obtain better performance.

In general, the set of pixels obtained by checking the combined low-intensity and low-contrast criterion will be a non-convex set which may have a ragged boundary. The step of approximating that boundary by a convex curve results in a boundary area having a smoother and, in particular, convex contour which is very suitable for the further steps in the process of creating an iris code and is nevertheless capable of describing a pupil shape that deviates significantly from a circular or elliptic shape.

While a circle can be fully described by three independent parameters, i.e. the radius and the x and y coordinates of the center, and an ellipse can be fully described by five independent parameters (the coordinates of the two focal points and the dimension of the large axis), the method according to the invention permits to describe the boundary of the pupil as a geometrical line object that can only be fully described by more than five independent parameters. For example, the pupil boundary may be described by a polygon that has such a large number of vertices that it approximates a smooth closed line. In this case, the independent parameters necessary for describing the line object are the coordinates of each of the vertices. Other examples of possible boundary descriptions are Bezier curves, or B-spline curves.

In a preferred embodiment, the convex curve describing the pupil boundary is a convex hull of the set of pixels. This provides a simple way of minimizing the effects of granula iridica and, in extreme cases, of creating a single encompassing pupil region when the low-level segmentation produces disconnected areas.

As an alternative, something similar could be accomplished by shrinking an egg or almond shaped parametric curve until it could not be shrunk further without sacrificing some pupil pixels. Curves of this type can be represented by polynomial curves of order three or above or by unions of circular arcs of varying radius. This parametric approach might, in fact, be a preferred technique when dealing with a vertebrate such as a goat or a cat which has a more regular pupil than a horse but not one that can be modeled as a circle or ellipse.

In general, identification systems based on iris analysis have to cope with the problem that, when the image of the eye is taken, the iris will normally be distorted to some extent, because the pupil that is surrounded by the iris dilates and contracts dependent on the illumination conditions. It is therefore required for an efficient iris analysis that the image of the iris is normalized in order to eliminate the distortions caused by the pupil dilation and contraction. In known iris analysis methods for individuals that have circular pupils, as most humans, the normalization can be achieved by using polar coordinates and normalizing the radius coordinate to the difference between the radii of the circular outer and inner boundaries of the iris. The segmentation method according to the invention has the advantage that it provides a description of a pupil contour that can be used for constructing a coordinate system permitting to normalize the iris image even when the pupil contour, i.e. the inner boundary of the iris, is neither circular nor elliptic.

It is therefore another object of the invention to provide a method of creating a binary iris code based on a normalization of the iris image which, by using the segmentation method described above, is more robust against irregular pupil shapes.

Further objects and features of the invention will become clear as the description proceeds.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

Figure 1:
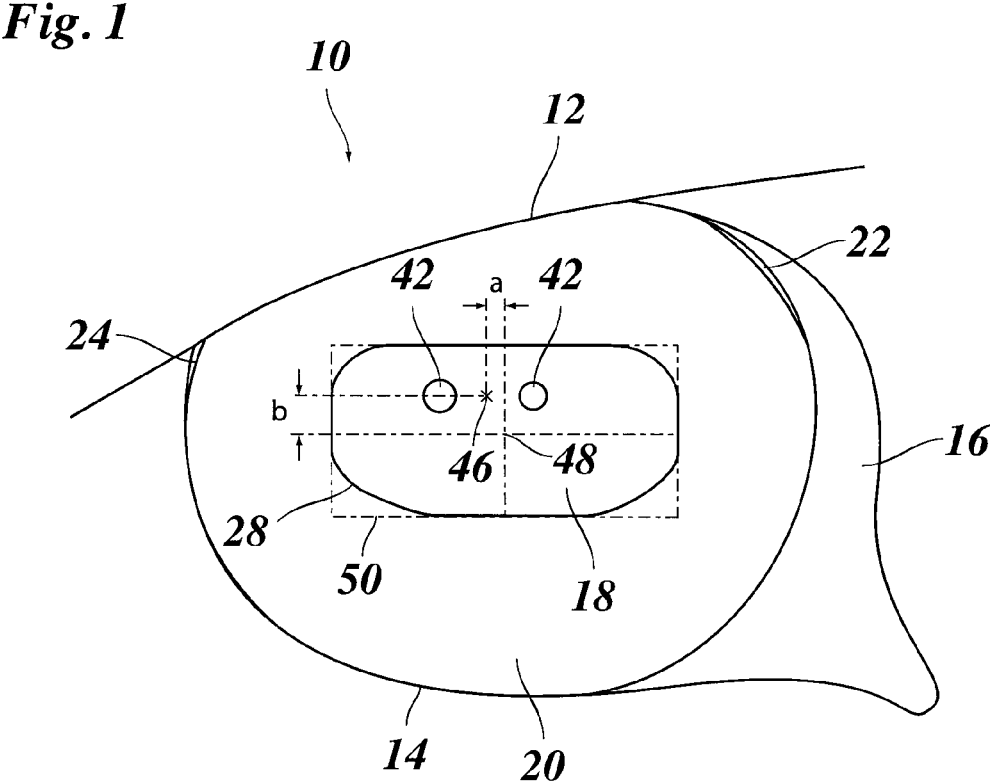
FIG. 1 is a schematic front view of an eye of a vertebrate.

As an example of an image of an eye of a vertebrate, FIG. 1 shows an image of a (left) eye 10 of a horse. An upper lid 12, a lower lid 14, a conjunctiva 14, a pupil 18 and an iris 20 of the eye have been shown schematically. As is typical for horses, the pupil 18 is elongated in lateral direction. A bright sclera 22 of the eye is obscured almost completely by the eyelids, so that only small fractions of an outer boundary 24 of the iris (iris/sclera boundary) are visible.

Figure 2:
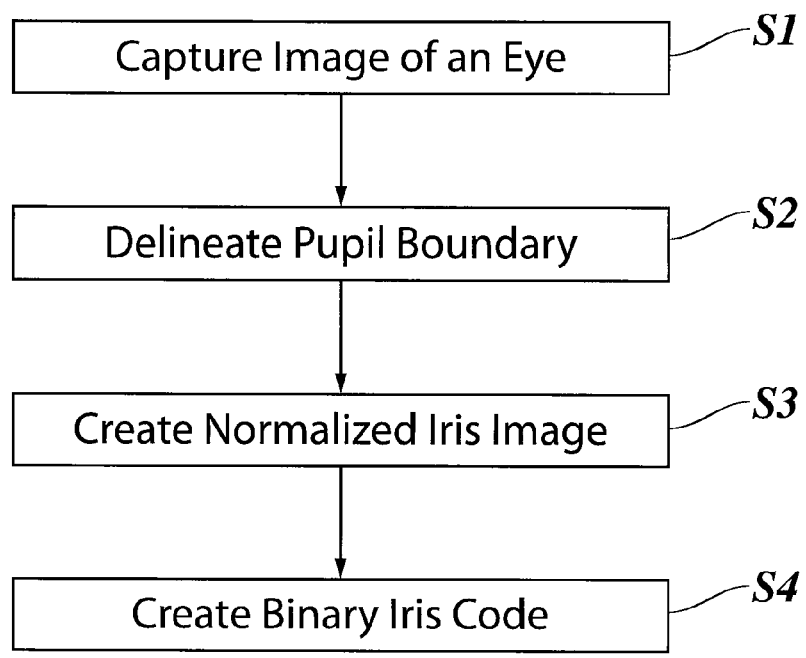
FIG. 2 is an overall flow diagram of a method for creating an iris code from a captured image of the eye.

FIG. 2 illustrates essential steps of a method for creating an iris code from an image of the type shown in FIG. 1.

Figure 3:
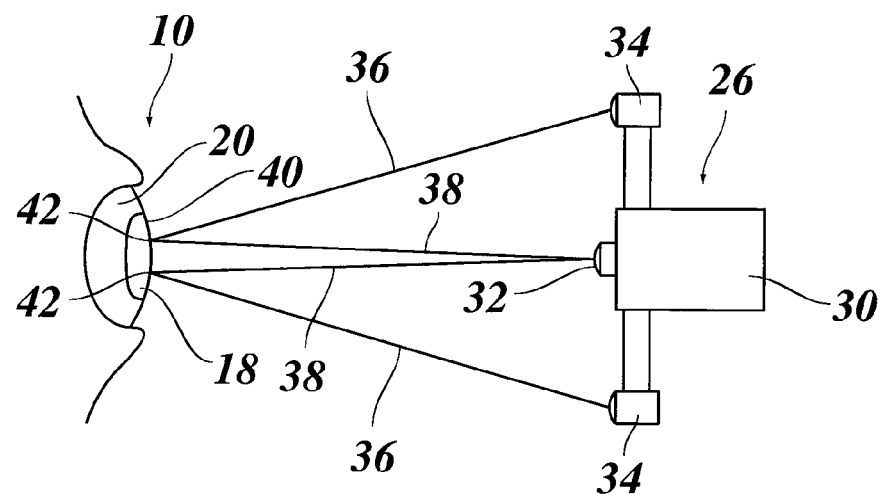
FIGS. 3 and 4 are top plan views of the eye and a camera for taking an image of the eye.

In a step S1, an image of the eye is captured with a digital camera 26 (shown in FIG. 3).

In step S2, the digital image is subjected to image processing algorithms for delineating a boundary 28 of the pupil 18.

In step S3, the image is subjected to further image processing for creating a normalized iris image, i.e. an image of the iris that is normalized to a standard size of the outer iris boundary 24 and a standard size of the pupil 18. Such image normalization is necessary because, in practice, the pupil 18 dilates and contracts in response to varying illumination conditions, so that, when two images of the same iris are compared, the position and shape of the pupil boundary 28 will normally not be the same.

Finally, in step S4, the normalized iris image is filtered with suitable filter for obtaining a binary iris code which has a reasonable number of bits and is nevertheless capable of encoding the characteristic structural features of the iris 20.

As is shown in FIG. 3, the camera 26 that is used for capturing the image of the eye 10 in step S1 as a casing 30 and an object lens 32. Two light sources 34 are rigidly mounted on the casing 30 and are disposed symmetrically on both sides of the object lens 32. Preferably, the light sources 34 emit light in the near infrared to which the camera 26 is sensitive, so that the light sources provide good illumination conditions without blinding the horse and causing the pupil 18 to contract excessively. Near infrared illumination is used also to more effectively reveal iris structure because it penetrates iris pigment better than visible wavelengths.

As has schematically been shown in FIG. 3, ingoing light rays 36 propagate from each of the light sources 34 to the eye 10 and outgoing rays 38 propagate from the eye 10 to the object lens 32 after having been reflected at a cornea 40 of the eye.

As a result, the image captured with the camera 26 includes a specularity pattern formed by two bright specular spots 42 (see also FIG. 1), which are reduced mirror images of the two light sources 34. Although the light sources 34 have identical sizes and brightnesses, the spots 42 may be different in size, dependent upon the local curvature of the cornea 40.

The positions of the specularity spots 42 in the image are determined by the positions of the light sources 34 relative to the camera 26 (FIG. 3) and by the position of the camera 26 relative to the eye 10, in accordance with the laws of geometrical optics. The ingoing ray 36 from each light source and the corresponding outgoing ray 38 are symmetric with respect to the axis of incidence, i.e. the normal to the cornea 40 at the reflection point of the rays 36, 38.

Figure 4:
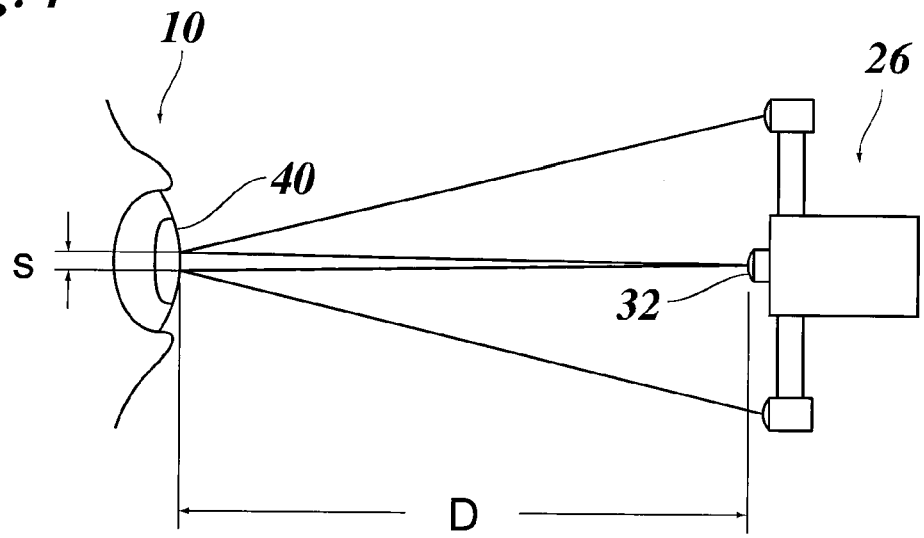

More specifically, as has been illustrated in FIG. 4, the spacing s between the two spots 42 becomes smaller when the distance D between the camera 26 and the eye 10 becomes larger. Thus, since the distances of the light sources 34 from the object lens 32 are known, it is possible to calculate the camera-to-eye-distance from the spacing between the specularity spots 42 when the shape of the cornea 40 is known.

In a first approximation, the cornea 40 can be assumed to be spherical with a constant curvature that will be known for a given species, at least for adult individuals. For non-adults, there will be a known relation between the curvature of the cornea 40 and the age of the individual. In this first approximation, the camera-to-eye-distance D can be calculated on the basis of straightforward geometrical considerations.

In a more realistic approach, the local curvature of the cornea 40 will be a function of the distance of the respective incidence point from the center of the pupil 18. Then, for a given configuration of the camera 26 and the light sources 34 and a given animal species, the relation between the spacing s of the specular spots 42 and the camera-to-eye-distance D will be given by a function that can be determined empirically. An example of a graph 44 of such a function has been shown in a diagram in FIG. 5, where the specularity spacing s, as measured in units of pixels in the digital image, is indicated on the abscissa, and the camera-to-eye-distance D is indicated on the ordinate.

For certain species, e.g. for horses, the cornea typically has different (but constant) curvatures in the vertical and horizontal direction. Then, the assumption of a spherical cornea is realistic as long as the specularity spots 42 are separatated along a roughly horizontal section.

In a processor for processing the digital image obtained with the camera 26 (the processor may be implemented in the camera 26 and has not been shown here), the function represented by the graph 44 may be stored in the form of a look-up table or in the form of an algebraic expression, so that the camera-to-eye-distance D can readily be derived from the spacing s between the spots 42.

Figure 6:
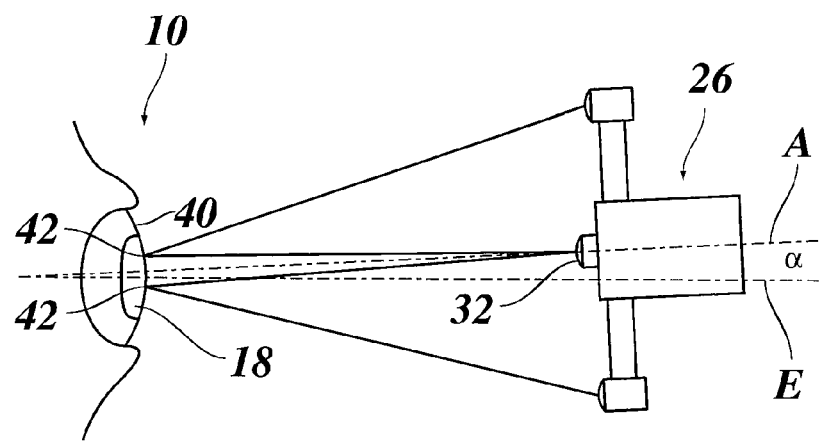
FIG. 6 is a top plan view similar to FIGS. 3 and 4 for an oblique aspect angle of the camera.

FIG. 6 illustrates a situation in which the camera 26 captures the image of the eye 10 from a slightly inclined position, so that an aspect axis A that passes through the eye 10 and the camera 26 forms an angle α (aspect angle) with a line of sight S of the eye 10, the line of sight S being defined as a line that passes through the center of the pupil 18 and is normal to the plane of that pupil. In this case, one of the specular spots 42 is closer to the line of sight S and hence to the center of the pupil 18 than the other spot.

In practice, the optical axis A of the camera 26 may deviate from the line of sight S of the eye 10 in both, horizontal direction (as shown in FIG. 6) and vertical direction (not shown). In FIG. 1, a common center or mid-point of the spots 42 has been designated as 46. A deviation of the camera 26 from the line of sight S in horizontal direction translates into a horizontal offset a of the mid-point 46 from a centroid or center 48 of the pupil 18, and a deviation of the camera from the line of sight S in vertical direction translates into a vertical offset b.

When the camera-to-eye-distance D is known, the aspect angles such as the angle α can be calculated from the offsets a and b. In order to measure these offsets in the digital image, the position of the center 48 of the pupil 18 must be known. To that end, as is generally known in the art of image processing and has been illustrated in FIG. 1, a rectangular bounding box 50 may be drawn around the relatively dark area of the pupil 18, and the center of that bounding box 50 may be taken as the center 48 of the pupil.

Thus, in summary, an analysis of the specularity pattern (spots 42) permits to determine four of the six degrees of freedom of the position of the camera 26 relative to the eye 10. The two remaining degrees of freedom are rotations of the camera about a horizontal and a vertical axis, respectively, which, however, lead only to a shift of the image in horizontal and vertical direction in FIG. 1 and can easily be compensated by moving the image such that the center 48 of the pupil will be in the center of the image. Knowledge of the four relevant degrees of freedom of the camera 26 permits to check the camera position at the very instant when the image of the eye is captured.

Figure 7:
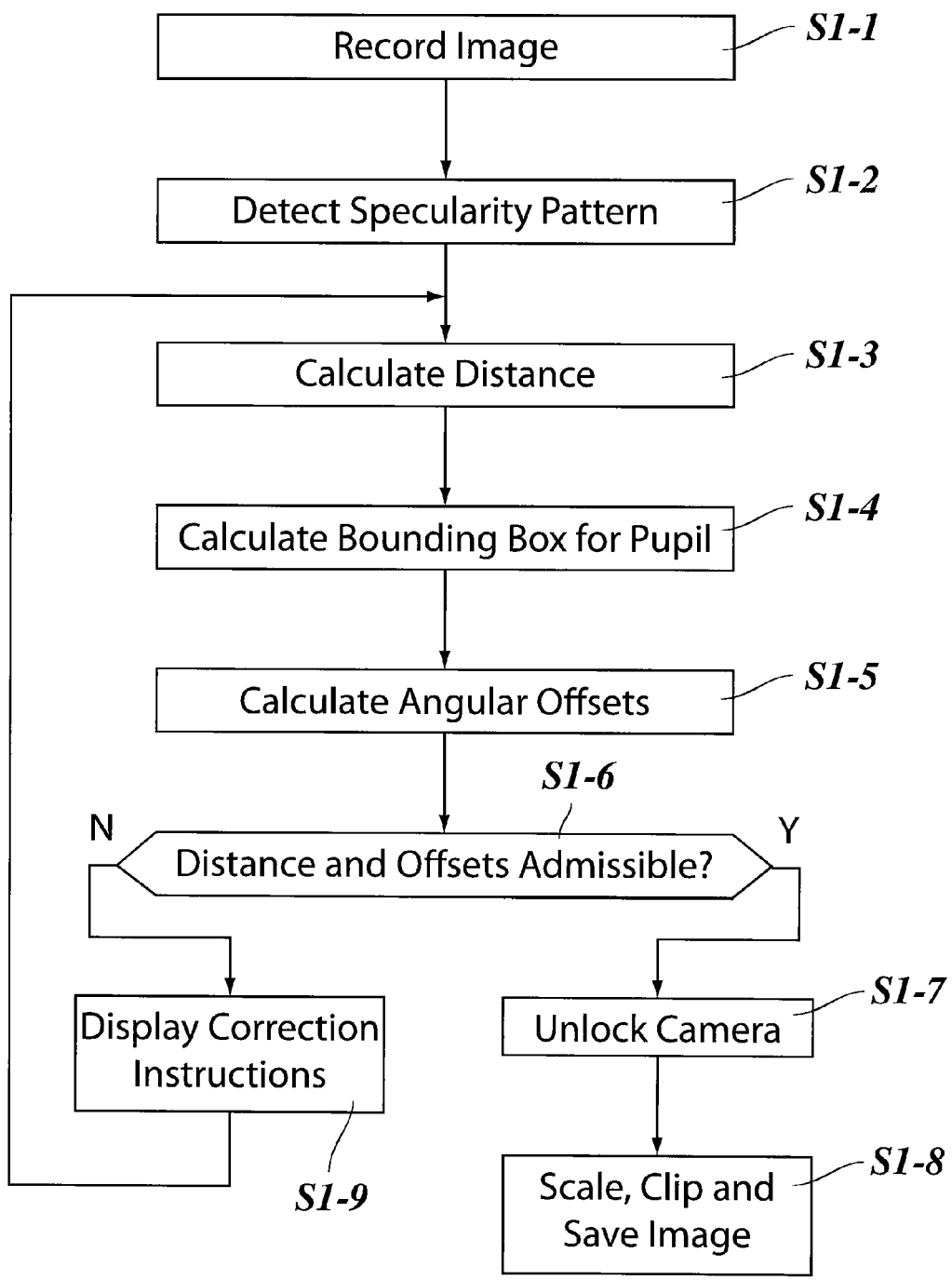
FIG. 7 is a flow diagram of an image capturing method.

An example of a method of image capturing utilizing the principles that have been described above will now be explained in conjunction with a flow diagram shown in FIG. 7. This flow diagram expands the step S1 in FIG. 2.

In step S1-1, the image of the eye 10 is "recorded" with the camera 26. This means that the camera is operating in a video mode in which the image data are continuously transmitted from a CCD array of the camera to a processing module where they are processed further. Simultaneously, the image may continuously be displayed on a display of the camera, but the image data are not yet saved in a memory as long as the user of the camera does not actuate a trigger button of the camera.

In step S1-2, the processing software searches for the specularity pattern, i.e. for the bright spots 42, in the digital image. These spots will have the highest intensity values in the entire image, so that they are easy to find and can then serve as a guide indicating the image area where the pupil (18) of the eye should be expected.

Figure 5:
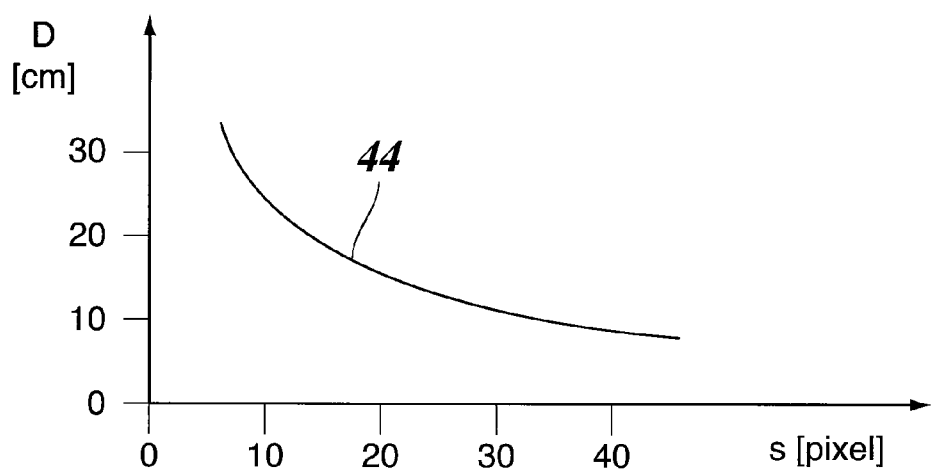
FIG. 5 is a diagram illustrating a relation between a camera-to-eye distance and a spacing of specularity spots.

In step S1-3, the distance between the spots 42 is measured (in units of pixels), and the camera-to-eye-distance D is calculated on the basis of a function of the type shown in FIG. 5.

In step S1-4, the processing algorithm searches a region with very low intensity values in the vicinity of the spots 42. This region is a candidate for the pupil 18 and is enclosed in the bounding box 50. This provides at least a rough estimate for the position of the center 48 of the pupil.

Then, in step S1-5, the offsets a and b (FIG. 1) are measured and the aspect angles (the angle α and its counterpart for a vertical offset) are calculated on the basis of the camera-to-eye-distance D that has been calculated before in step S1-3.

Optionally, the angular offsets may be used for refining the calculation of the camera-to-eye-distance D. When the cornea 40 is not spherical, the exact shape of the graph 44 in FIG. 5 will also depend upon the angular offsets, so that an appropriate function for deriving the distance D from the specularity spacing should be selected dependent upon the actual values of the angular offsets.

In step S1-6, the calculated distance D and the angular offsets are checked against predetermined tolerance ranges. When the calculated values are within their respective tolerance ranges (Y), this means that the camera is in a suitable (or almost optimal) position for capturing the image of the eye 10. Then, the camera is unlocked in step S1-7, and a corresponding "ok" sign is shown on the display of the camera, signaling to the user that he may push the trigger button. When the camera is triggered, in step S1-8, the image is scaled to a standard size on the basis of the calculated distance D, so that eyes of equal size will also have the same size in the digital image, regardless of the exact camera-to-eye-distance. Further, the image is clipped to a standard height and width which are selected such that the image will contain only the relevant image part, i.e. the region around the iris 20. Finally, the scaled and clipped image is saved in a memory for further processing.

When it is found in step S1-6 that at least one of the distance D and the angular offsets is not admissible (N), corresponding correction instructions are shown on the camera display in step S1-9, showing the user how he has to move the camera in order to bring the distance and the angular offsets into the respective tolerance ranges. From step S1-9, the program loops back to step S3, and the steps S1-3 to S1-6 are repeated until a suitable camera position has been reached.

In a modified embodiment of this method, calculations corresponding to those in steps S1-3 to S1-5 will be performed only after the camera has been triggered and the image has been saved. Depending on the result of a check that is comparable to step S1-6, the user will then be advised whether the image is accepted or rejected. In this case, the processing does not have to be done in the camera but may done in a multi-purpose computer to which the camera 26 is connected after the image has been taken.

Figure 8:
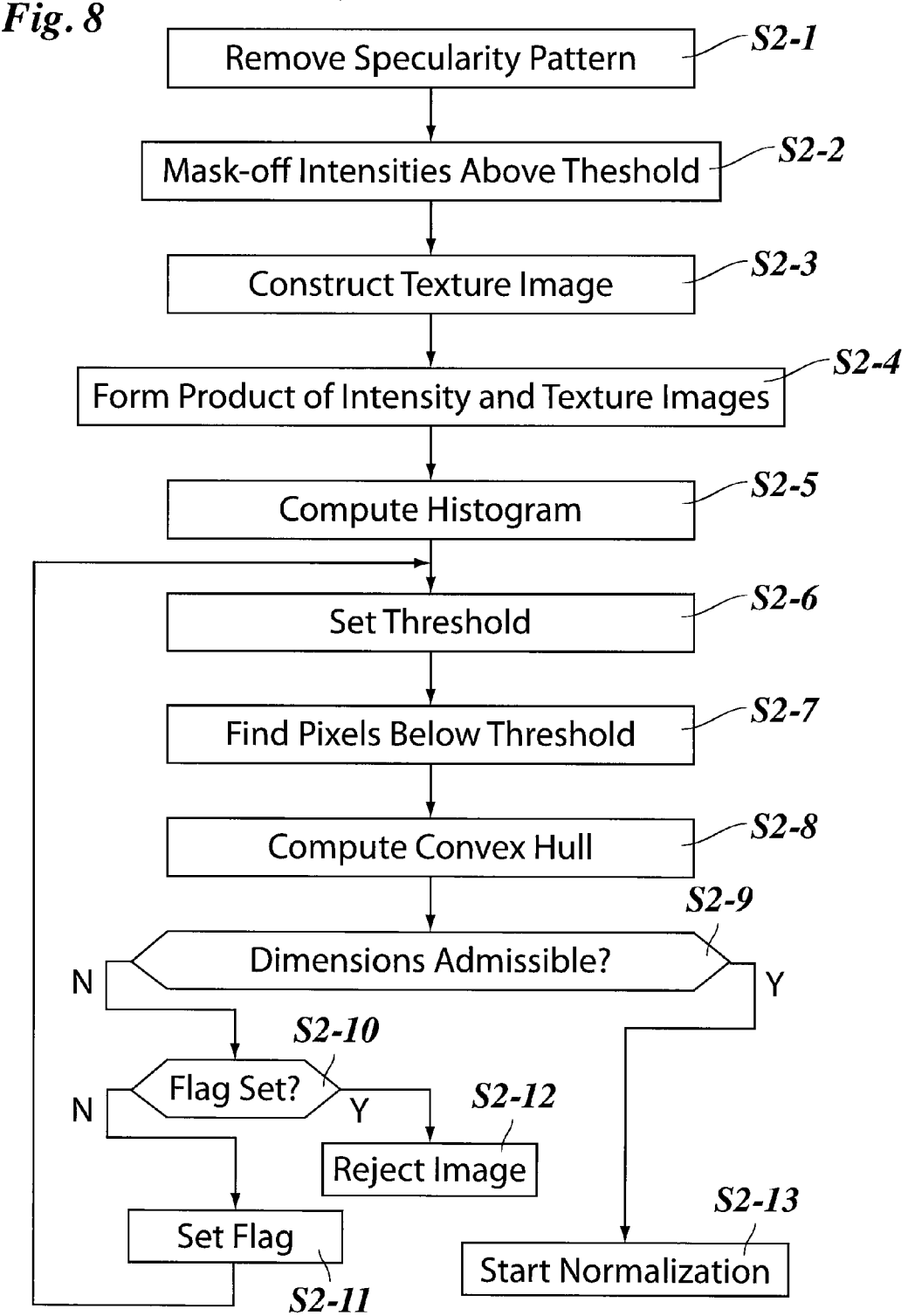
FIG. 8 is a flow diagram of a method according to the invention for segmenting a pupil in the image of the eye.

FIG. 8 is a flow diagram expanding the step S2 (FIG. 2) of delineating the pupil boundary 28 (FIG. 1).

In this example, the image that has been saved in step S1-8 is a monochromatic (infrared) intensity image, wherein an intensity value is assigned to each pixel of the image. Of course, a straightforward extension to color images with, for example, three intensity values per pixel would be possible.

In the intensity image, the area of the pupil 18 is a low intensity area which, however, is "pierced" by the specularity spots 42. In order to reconstruct the original pupil area, the specularity pattern is removed in step S2-1. This can be achieved by means of an inpainting algorithm which fills in the area of the spots 42 using information from the surrounding area of the pupil 18. Mathematically, the problem is equivalent to solving a system of Navier-Stokes equations in classical fluid dynamics, when the image intensity is considered as a "stream function" for a two-dimensional incompressible flow. The Laplacian of the image intensity plays the role of the vorticity of the fluid and is transported into the region of the spots 42 by a vector field defined by the stream function. Details of the algorithm are described by Bertalmio, M.; Bertozzi, A. L.; Sapiro, G.: "Navier-Stokes, Fluid Dynamics and Image and Video Inpainting" Computer Vision and Pattern Recognition, 2001, CVPR 2001, Proceedings of the 2001 IEEE Computer Society Conference, vol. 1, pp. 1-355-1-362. Of course, any other known inpainting method may used.

As the pupil 18 is a low intensity area, the intensities are compared to a threshold in step S2-2, and pixels having an intensity above the threshold are masked-off, so that only low intensity areas remain which should include the pupil area. The threshold value may for example be 25% of the highest intensity value (after the specularity spots 42 have been eliminated).

The pupil area is not only characterized by low intensity values but also a low texture area, i.e. an area that is almost free of substantial high-frequency intensity variations. This is why, in addition to the intensity criterion, the method for identifying the pupil area uses also a texture image that is constructed in step S2-3.

The texture image can be derived from the intensity image by computing an edge contrast for each pixel. For example, a Sobel first derivative filter may be used for that purpose, and the output may be smoothened with a spatial averaging filter.

Step S2-4 is a step of forming a pointwise product of the masked intensity image obtained in step S2-2 and the texture image obtained in step S2-3, i.e. the intensity value of each pixel is multiplied by the contrast value of that pixel. Thus, image areas in the masked intensity image which have both, a low intensity and low texture are characterized by particularly low values in the product image. The pixels of the pupil area can be expected to have the lowest product values in the entire image, and, moreover, these product values will be almost identical, since the pupil area is essentially uniform in both, intensity and texture. Consequently, a good estimate for the real pupil area will be obtained by comparing the product values to a suitably selected threshold.

Figure 9:
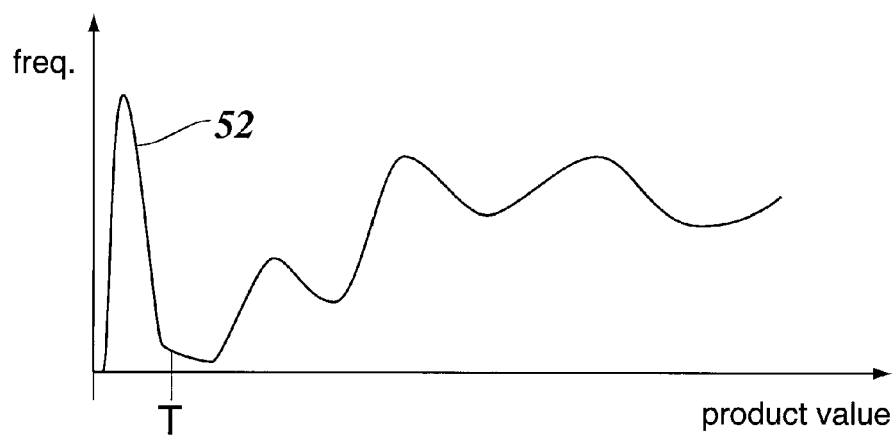
FIG. 9 is an example of a histogram used in the method that has been illustrated in FIG. 8.

To that end, a histogram of the product image is computed in step S2-5. An example of such a histogram has been illustrated in FIG. 9, showing the frequency of occurrence of each product value (i.e. the number of pixels having that product value) as a function of the product value. The pixels of the pupil 18 will form a distinct peak 52 at the low end of the histogram.

In step S2-6, a threshold T (FIG. 9) is selected such that it marks the high end of the peak 52. Consequently, all the pixels having product values below the threshold T can be expected to form the pupil area.

Figure 10:
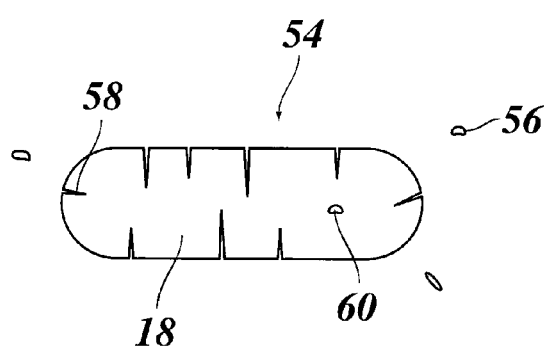
FIG. 10 is an example of a set of pixels obtained in the pupil segmentation process.

The set of pixels that fulfils this threshold criterion is selected in step S2-7. An example of such a set 54 has been shown in FIG. 10. In practice, there may of course be outliers, e.g. "islands" 56 of pixels which are located outside of the area of the pupil 18 but have product values below the threshold T, and "bays" 58 and "lakes" 60 of pixels inside the pupil area which have product values above the threshold T.

In step S2-8, the islands 56 are eliminated, using well known image processing techniques such as morphological dilation and erosion operations. The bays 58 and lakes 60 are eliminated by forming the convex hull of the remaining set 54, as has been shown in FIG. 11. Normally, this convex hull will be a good guess for the real boundary 28 of the pupil 18.

There may however be cases where the pupil area obtained in this way is unrealistically or unacceptably large or unrealistically or unacceptably small. Reasons for this may be for example an inappropriate choice of the threshold T or an extreme dilation or contraction of the pupil of the horse as a result of abnormal illumination conditions. The latter case will not actually be "unrealistic", but should nevertheless be excluded, because extreme dilations or contractions of the pupil would imply that the iris 20 is distorted to an extent that makes the match of iris codes impossible even for images taken from the same individual. For this reason, it is checked in step S2-9 whether the dimensions of the iris 18, e.g. the total height, as determined on the basis of the convex hull is within an acceptable range. The upper and lower limits of this range can be determined empirically for the given species of vertebrates. It should be noted in this context that the height of the pupil area in the digital image can be taken as a measure for the actual height of the pupil because the image capturing process (step S1) assures that the images are always taken from approximately the same distance and remaining distance variations have been compensated by image scaling.

If the result of the check in step S2-9 is negative (N), it is checked in step S2-10 whether a flag has been set. If the flag has not been set (N), the flag is set in step S2-11, and the program loops back to step S2-6. It will then be attempted in step S2-6 to obtain a pupil with reasonable size by correcting the threshold T. When the dimension of the pupil was too large, the threshold T will be shifted to lower values, and it will be shifted to higher values when the dimension of the pupil was too small. When the steps S2-6 to S2-8 have been run-through a second time, and it is still found in step S2-9 that the dimensions of the pupil are not acceptable, it is found in step S2-10 that the flag is set (Y) which indicates that an attempt to correct the threshold T has already been made and has failed. In this case, the image is rejected in step S2-12 and the user is invited to capture a new image.

Of course, in a modified embodiment, the flag checked in step S2-10 may be replaced by a count value counting the number of times that the loop S2-6 to S2-11 has been run-through, so that a larger number of correction attempts for the threshold T can be made.

When the check in step S3-9 has the result that the dimensions of the pupil are acceptable (Y), the process of delineating the pupil boundary is completed, and the program continues with in step S2-13 for calling the procedure for normalizing the iris image (step S3).

In a modified embodiment, the calculation the angular offsets (as in step S1-5 in FIG. 7) or a more exact calculation of these offsets may be performed subsequent to the delineation of the pupil boundary so that the more exact pupil boundary may be used for determining the position of the center 48 of the pupil.

Figure 11:
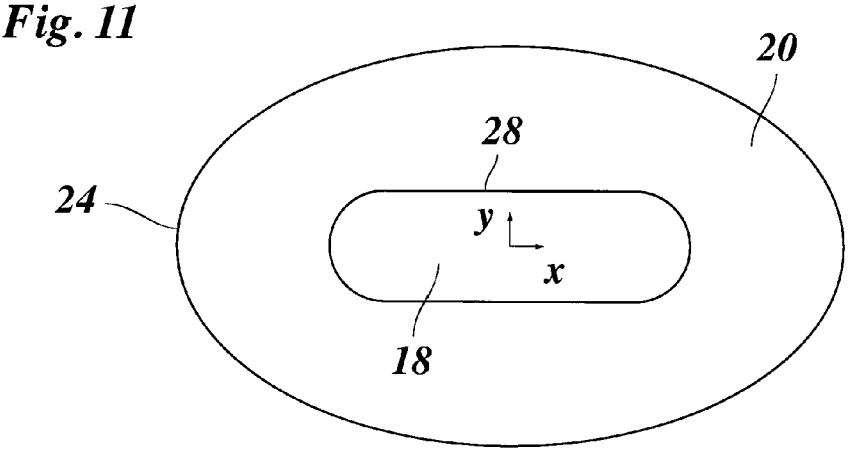
FIG. 11 illustrates the contour of the pupil obtained as a result of the segmentation process.

As is shown in FIG. 11, the iris 20 is a ring shaped area that is delimited at the inner periphery by the pupil boundary 28 and at the outer periphery by the iris/sclera boundary 24. When the pupil 18 dilates or contracts while the outer boundary 24 of the iris remains unchanged, each point of the iris 20 will be shifted in a generally radial direction by an amount that is large when the point is close to the pupil boundary 28 and becomes smaller when the point is closer to the stationary outer boundary 24. The purpose of the normalization step S3 is to obtain a normalized iris image that is not affected by the dilations and contractions of the pupil 18, so that the iris images and the resulting iris codes can be compared to one another.

The approach is to transform the coordinates of the pixel of the iris area from a Cartesian xy-coordinate system (shown in FIG. 11) into a coordinate system that may be called a "generalized polar coordinate system".

If the pupil 18 could be assumed to be circular, a true polar coordinate system could be used, as is known for iris analysis for humans. In that case, normalization for varying pupil radii could easily be achieved by setting the radius coordinate of the pixel in proportion to the difference between the radius of the iris/sclera boundary and the radius of the pupil. However, in the method that is discussed here, the pupil boundary 28 is not defined as a circle but as a more complex geometrical line object which can only be described by a larger number of parameters. for example, the boundary 28 may be polygon with a very large number of corners connected by straight line segments which will approximate the smooth contour of the true boundary. Such object can only be described by defining the coordinate positions of each vertex of the polygon. This makes the identification system more robust against irregular pupil shapes but, on the other hand, requires a non-trivial coordinate transformation for normalization purposes.

Figure 12:
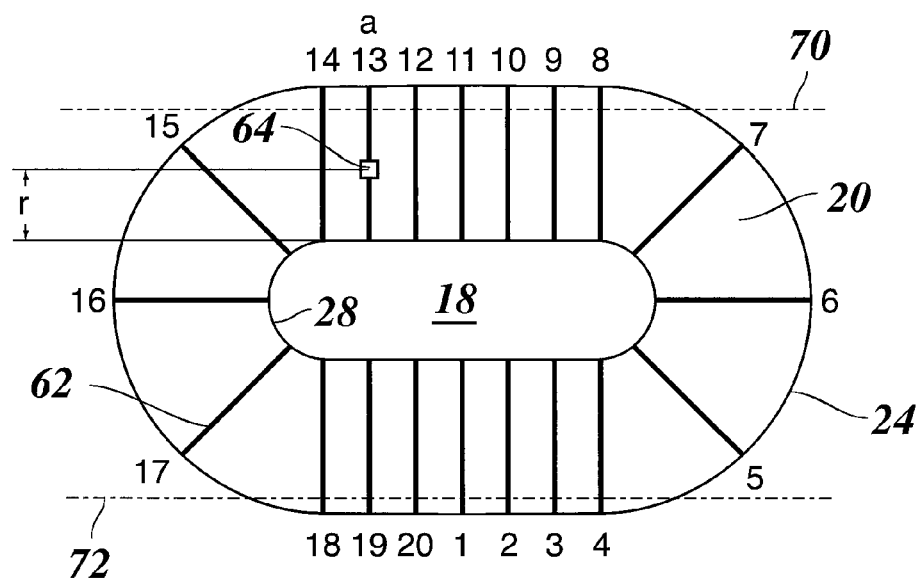
FIG. 12 is a diagram illustrating a first embodiment of a method for normalizing an image of the iris of the eye.

In order to obtain a suitable new coordinate system, the ring-shaped area of the iris 20 is divided into a sequence of radial spokes 62, as has symbolically been shown in FIG. 12. In practice, the number of spokes will be significantly larger than in FIG. 12, preferably so large that each pixel of the image lies on one of the spokes 62. This may involve a re-dimensioning and re-shaping of the pixels. For at least some of the spokes 62, the spacing from spoke to spoke is larger near the outer boundary 24 than near the pupil boundary 28. Near the outer boundary 24, larger pixels may be formed by sampling or averaging over a plurality of pixels of the original image, which means a loss of resolution. Conversely, when the original pixel size is approximately retained near the outer boundary 24, two or more of the spokes 62 may pass over the same original pixel near the pupil boundary 28, which means that the image information becomes redundant. The number and density of the spokes 62 is therefore selected to be a reasonable compromise between resolution and redundancy.

The spokes 62 are numbered sequentially along the boundary of the pupil 28. In the simplified example in FIG. 12 (20 spokes), the spoke numbers are running from 1 through 20. For a pixel located on a given spoke 62, the running number of that spoke will be the first coordinate "a" in the new coordinate system. As an example, FIG. 12 shows a pixel 64 on spoke number 13, so that the first coordinate "a" of this pixel will be a=13. A second coordinate r of the pixel 64 is determined by its location on the spoke, normalized to the entire length of the corresponding spoke, so that a pixel located on the pupil boundary 28 would have the second coordinate r=0 and a pixel located on the outer boundary 24 of the iris would have the coordinate r=1.

Thus, when the pupil boundary 28 is dilated while the (a, r)-coordinates are kept constant, the pixel 64 designated by these coordinates will move outwardly along its spoke. This movement of the pixel will at least approximately simulate the movement of the corresponding point on the iris when the iris is physically distorted by the dilation of the pupil.

Thus, when two images of the same iris are captured for different dilation states of pupil 18, pixels having the same (a, r)-coordinates will at least approximately have the same intensity values.

In the scheme that has been described above, there is still some choice in the exact arrangement of the spokes 62. In the example shown, the spokes are arranged to be normal to the pupil boundary 28 (i.e. normal to the tangent to this boundary at the point where the spoke meets the boundary).

In a modified embodiment, a number of equidistant points may be defined on the pupil boundary 28, and a like number of equidistant points might be defined on the outer boundary 24, and the spokes may be formed by connecting corresponding points on the two boundaries.

Other arrangement of the spokes 62 are also possible as long as the way how the pixels are shifted in response to dilations and contractions of the pupil correspond with sufficient accuracy to the actual distortion of the iris.

When the iris/sclera boundary 24 or at least a substantial part thereof is visible in the captured image, so that any obscured parts of the boundary can readily be interpolated on the basis of the assumption that the boundary has a regular (e.g. circular) shape (as is typically the case for humans), the length of each spoke 62 is determined by the requirement that the outer end of the spoke must be located on the boundary 24. However, when the boundary 24 is largely obscured as in the example shown in FIG. 1, a suitable way must be found to "reconstruct" the boundary 24 or, more precisely, to construct an imaginary boundary that will be similar to the real boundary.

In the example shown in FIG. 12, it is assumed that the height of the iris 20, i.e. the distance between the lower apex and the upper apex of the boundary 24, is essentially the same for all adult individuals of the same species. For horses, it has been confirmed that this assumption is fulfilled with sufficient accuracy.

Since the image that has been obtained in step S1-8 is scaled to a standard camera-to-eye-distance D, the above assumption implies that the vertical dimension of the boundary 24 has a fixed value, e.g. 150 pixel in the x-y coordinate system shown in FIG. 11. Then, a reasonable value for the length of the spokes 62 can be obtained by subtracting the vertical dimension of the pupil 18 (measured in pixels in FIG.

11) from the vertical dimension of the boundary 24 and dividing the difference by two. In the example shown in FIG. 12, all the spokes 62 are assumed to have the same length which is calculated pursuant to this formula. Together with the requirement that the spokes are normal to the pupil boundary 28, this defines the shape of the outer boundary 24.

At least for horses, this way of constructing the boundary 24 is realistic. When the dilation and contraction of the pupil 18 is not isotropic, the horizontal dimension of the boundary 24 (distance from the left apex to the right apex in FIG. 12) will not be exactly constant. However, the resulting deviations from the physical shape of the iris are found to be acceptable.

Figure 13:
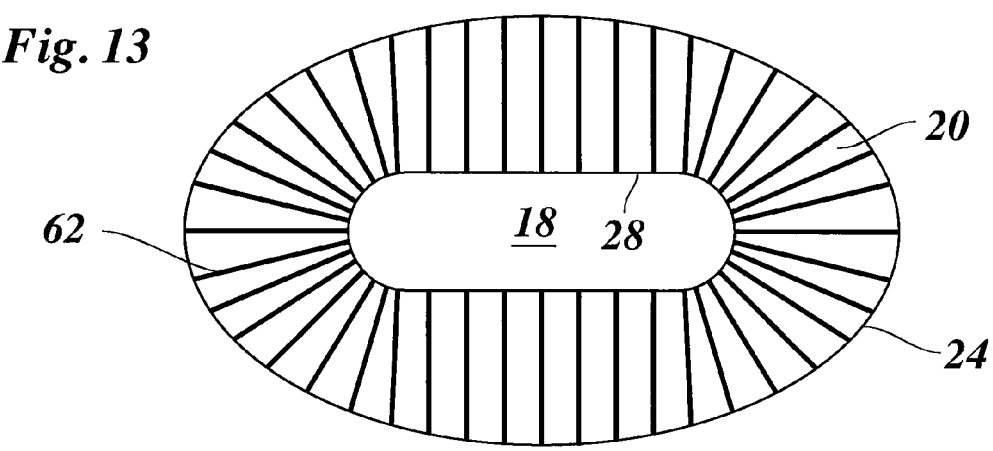
FIG. 13 is a diagram illustrating another embodiment of the method for normalizing the iris image.

FIG. 13 illustrates a modified embodiment wherein it is assumed that not only the height but also the width of the pupil 20 (its outer boundary 24) is constant, and the shape of the boundary 24 can be approximated by a suitable oval, such as an ellipse or a Cassini oval. In the example shown in FIG. 13, the height of the iris is assumed to be 150 pixel and the width is assumed to be 250 pixel. Again, the spokes 62 are arranged to be normal to the pupil boundary 28. Further, in this example, the spokes 62 have been arranged such that their outer end points (on the boundary 24) are equidistant. As an alternative, the inner end points (on the pupil boundary 28) may be made equidistant (as in FIG. 12), or equal distances may be required for corresponding points on the spokes 62 for any given coordinate value r between 0 and 1.

Figure 14:
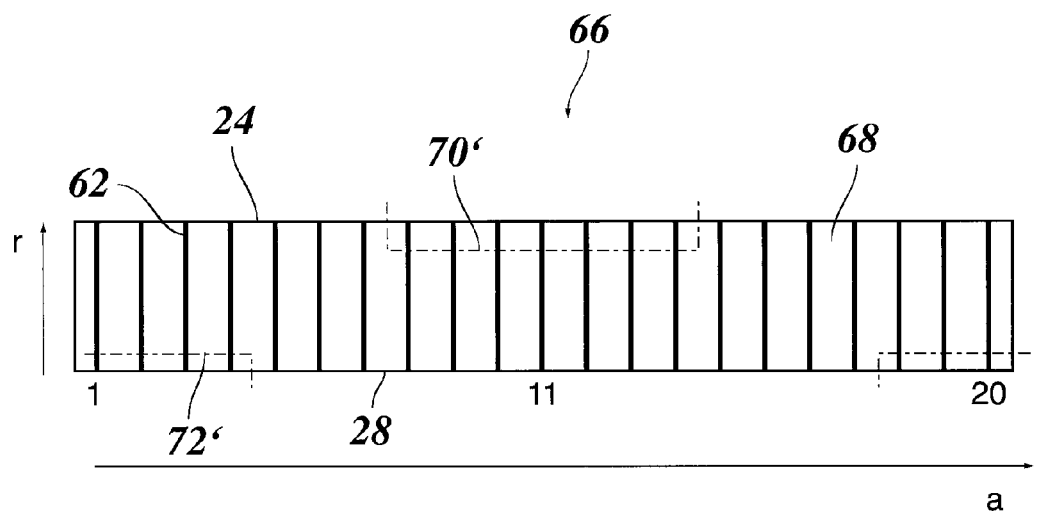
FIGS. 14 and 15 illustrate examples of normalized iris images.

FIG. 14 gives an example of a normalized iris image 66 resulting from the coordinate trans-formation that has been explained in conjunction with FIG. 12. Here, the (a, r)-coordinates are represented as Cartesian coordinates, with the a-coordinates on the abscissa and the r-coordinates on the ordinate, so that the ring-shaped area of the pupil 20 is evolved into a rectangular strip 68.

Figure 15:
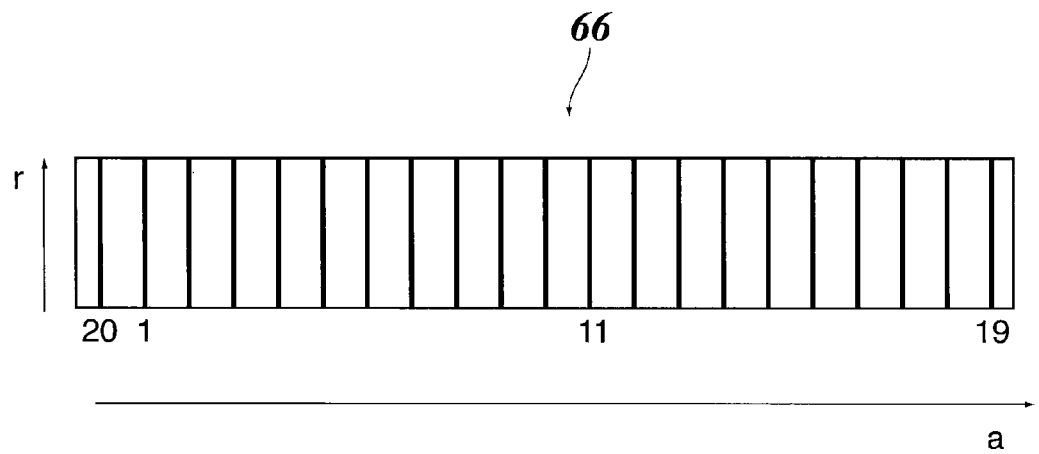

Ideally, two normalized iris images 66 obtained from two photographs of the same eye should be identical. In practice, however, the absolute position of, e.g., spoke number 1 on the pupil boundary 28 is somewhat arbitrary, so that the a-coordinates in one image may be slightly shifted relative the a-coordinates in the other image. This effect may be compensated by a slight "rotation" of the spoke pattern along the boundary 28 or, equivalently, a cyclic permutation of the spokes in the normalized image 66, as has been illustrated in FIG. 15.

Such a shift of the a-coordinates might also be caused by a slight rotation of the camera 26 about the aspect axis A (FIG. 6) when the image is captured. In this case, an alternative possibility to compensate the shift is to rotate the digital image (prior to the coordinate transformation) until the axis of largest elongation of the pupil is horizontal in the image.

Another type of differences between two normalized images taken from the same eye may be caused by different positions of the upper and lower eyelids 12, 14 at the instant when the photos are taken, so that smaller or larger parts of the iris 20 are obscured. Consequently, when comparing two normalized images, the areas of the iris that may be affected by slight movements of the eyelids should be ignored. In FIG. 12, these areas have been delimited by straight lines 70, 72 in the top and bottom parts of the iris 20. In FIG. 14, the ignored parts of the strip 68 in the normalized image 66 are delineated by corresponding lines 70', 72'.

In order to facilitate and speed up the identification of individuals, the normalized images 66 are not directly compared to one another, but are subjected to a filter procedure resulting in a more compressed iris code (step S4 in FIG. 2). Such filtering procedures are known in the art. Examples are described by Daugman in U.S. Pat. No. 5,291,560 and in the article "How Iris Recognition Works" that has been cited in the introductory part of the present description. In brief, the process may include filtering horizontal slices through the normalized iris image 66 with logarithmic Gabor filters. This filter process provides a complex number of each point along the slice. The phases of these complex numbers may then be quantized into a two-bit representation specifying the quadrant in the complex plane in which the phase angle lies. These bits, together, form the iris code.

In order to identify an individual, the iris codes thus obtained are matched to one another. Preferably, the code match is repeated for several "rotated" versions of the normalized image 66 (FIG. 15), and the portions delineated by the lines 70', 72' in FIG. 14 are excluded from the code match.

The code match basically comprises computing the number of non-matching bits (Hamming Distance) by subjecting the two codes to be matched to an exclusive OR logical operation (XOR). The fraction of the non-matching bits in relation to the total number of bits indicates the probability that the two codes represent different eyes. When this fraction is smaller than a certain threshold, the code match is considered to have been successful.

Figure 16:
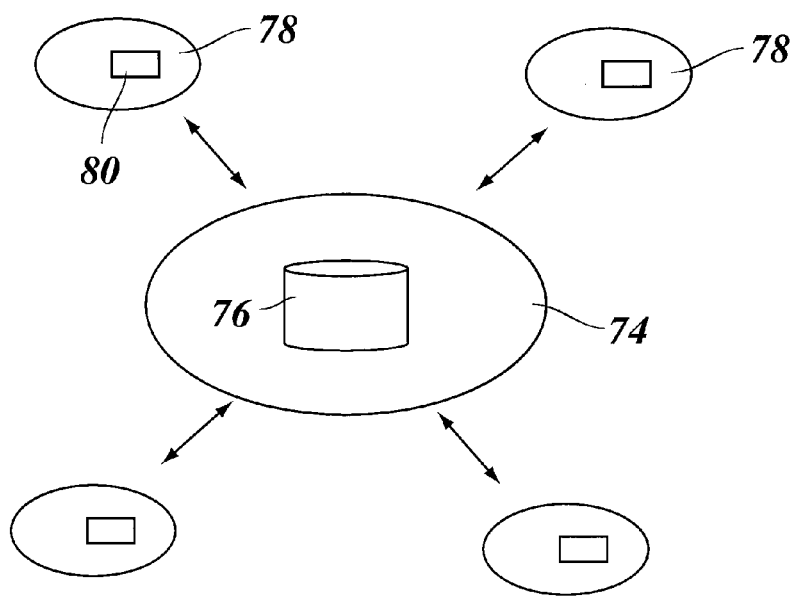
FIG. 16 is a block diagram of an identification system for horses, based on iris analysis.

FIG. 16 is a block diagram of an example of an identification system employing the method according to the invention and designed for identifying horses. A provider 74 of the identification services maintains a database 76 and communicates with a number of clients 78 via a communication network, e.g. the Internet.

Each client 78 can rent or purchase an iris code capturing kit 80 from the provider 74. Each kit 80 includes the camera 26 as well as the software and hardware necessary for performing the method that has been described above.

Figure 17:
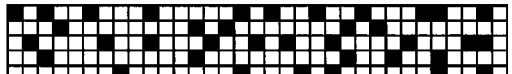
FIG. 17 shows an example of a record in a database used in the identification system shown in FIG. 16.

An example of a record 82 that is kept in the database 76 and describes an individual horse has been given in FIG. 17. The record 82 includes an iris code field 84 and several other fields for other relevant data about the horse, such as its name, race, color, and the like.

When a client 78 wants to register a horse in the database 76, he uses his kit 80 for capturing an image of one or both eyes of the horse and sends the iris code that has been created on the basis of this image to the database 76 along with other information to be entered into the record 82. Preferably, the client generates a plurality of iris codes for the same eye of the horse, and a software in the kit 80 or in the premises of the provider 74 checks whether these codes are consistent, i.e. whether code matches between these codes are successful. When a code match is not successful, another attempt may be made after having performed a cyclic shift of the bits in one of the codes to be compared, this bit shift reflecting a cyclic permutation of the spokes or a-coordinates as has been described in conjunction with FIGS. 14 and 15. When a sufficient number of iris codes has been obtained that can mutually be matched to one another, one of these codes or an average over all these codes may be transmitted to the database 76 to be entered into the iris code field 84.

When a client 78 wants to retrieve data about an individual horse from the database 76, he uses the kit 80 for creating an iris code for this horse and sends the iris code to the database 76, if possible together with other information for identifying the horse, such as the name, the owner, and the like. In order to find the pertinent record in the database, it may be more expedient to search for the name or other ID information rather than searching for a matching iris code. When a pertinent record has been found, the iris code sent by the client 78 may be checked against the iris code stored in the record in order to confirm the identity of the horse. Again, the code match may be repeated for a bit-shifted version of the code if the first attempt was not successful. Moreover, in order to improve the robustness of the identification, it is possible that the client 78 captures a plurality of images of the same eye of the same horse and sends the corresponding iris codes to the database 76, where they are matched against the stored code. Then, identity will be confirmed when at least one of the codes matches. The required number of codes may however be smaller than in the case that a new record is entered into the database.

When a client 78 tries to find out the identity of an unknown horse, he may send the iris code of that horse to the database 76, and this code may be checked against the codes that are stored in all the records 82 in the database, in order to determine the identity of the horse.

What is claimed is:

1. A method of pupil segmentation in a digital image of a vertebrate eye, said image being an intensity image composed of pixels having each a specific intensity value, the method comprising the steps of:
deriving a texture image from the intensity image, said texture image being composed of pixels having each a specific contrast value;
forming a combined image by point-wise combining the intensity image with the texture image,
identifying a set of pixels in the combined image which fulfill a combined low-intensity and low-contrast criterion; and
approximating a boundary of said set by a convex curve and taking said convex curve as a boundary of the pupil.

2. The method according to claim 1, wherein said convex curve is a convex hull of said set of pixels.

3. The method according to claim 1, wherein said combined image is a product image formed by point-wise multiplication of the intensity image with the texture image, and said combined low-intensity and low-contrast criterion is a threshold criterion for the product image.

4. The method according to claim 3, wherein a threshold for said threshold criterion is determined individually for the digital image, based on a histogram analysis of the product image.

5. The method according to claim 4, wherein the histogram analysis comprises identifying a peak at a lower end of a range of product values appearing in the product image, and the threshold is selected to separate said peak from the rest of the histogram.

6. The method according to claim 5, wherein said histogram analysis comprises a filtering operation for smoothening the histogram, said filtering operation being performed before the peak is identified.

7. The method according to claim 1, comprising a check whether a dimension of said boundary of the pupil, as described by said convex curve, is within a predetermined range.

8. The method according to claim 7, comprising a step of measuring a distance between the eye and a camera with which the digital image is captured, and a step of scaling the intensity image in proportion to the distance between the camera and the eye, such that dimensions of a detail in the image of the eye indicate the corresponding true dimensions of the detail in the real eye.

9. The method according to claim 7, wherein the segmentation process is aborted and the image is rejected when the dimension of the pupil boundary is not in said predetermined range.

10. The method according to claim 7, wherein, when said dimension is not in the predetermined range, the steps of identifying a set of pixels fulfill the combined low-intensity and low-contrast criterion and of approximating the boundary of said set by a convex curve are repeated for a combined low-intensity and low-contrast criterion.

11. The method according to claim 10, wherein the segmentation process is aborted and the image is rejected when the dimension of the pupil boundary is not in the predetermined range after the combined low-intensity and low-contrast criterion has been modified a predetermined number of times.

12. The method according to claim 1, for a digital image that includes a specularity pattern caused by reflection of at least one light source at a cornea of the eye, the method comprising a step of removing said specularity pattern from the intensity image before the other steps of the segmentation are performed.

13. The method according to claim 12, wherein an inpainting algorithm is used for removing the specularity pattern.

14. The method according claim 1, wherein said convex curve is a closed geometrical line object that can only be described by more than five independent parameters.

15. The method according to claim 13, wherein said line object is a polygon approximating a smooth closed curve.

16. A method of creating a binary iris code from a digital image of a vertebrate eye, including humans, with pupil segmentation, wherein said image is an intensity image composed of pixels having each a specific intensity value, the method comprising the steps of:
deriving a texture image from the intensity image, said texture image being composed of pixels having each a specific contrast value;
forming a combined image by point-wise combining the intensity image with the texture image;
identifying a set of pixels in the combined image which fulfill a combined low-intensity and low-contrast criterion;
approximating a boundary of said set by a convex curve and taking said convex curve as a boundary of the pupil; and
transforming a digital image of the iris into a coordinate system in which each point on the iris is described by a first coordinate that indicates the position of the point along the boundary of the pupil and a second coordinate indicates the distance of the point from said boundary.

17. An iris code generation kit comprising a camera and software and hardware suitable for carrying out the method of pupil segmentation in a digital image of a vertebrate eye, said image being an intensity image composed of pixels having each a specific intensity value, the method comprising the steps of:
deriving a texture image from the intensity image, said texture image being composed of pixels having each a specific contrast value;
forming a combined image by point-wise combining the intensity image with the texture image;
identifying a set of pixels in the combined image which fulfill a combined low-intensity and low-contrast criterion; and
approximating a boundary of said set by a convex curve and taking said convex curve as a boundary of the pupil.

18. An identification system for identifying vertebrates, including humans, on the basis of an iris code match, comprising at least one iris code generation kit comprising a camera and software and hardware suitable for carrying out the method of pupil segmentation in a digital image of a vertebrate eye, said image being an intensity image composed of pixels having each a specific intensity value, the method comprising the steps of:

deriving a texture image from the intensity image, said texture image being composed of pixels having each a specific contrast value;

forming a combined image by point-wise combining the intensity image with the texture image;

identifying a set of pixels in the combined image which fulfill a combined low-intensity and low-contrast criterion; and approximating a boundary of said set by a convex curve and taking said convex curve as a boundary of the pupil.

19. A non-transitory computer readable medium storing a computer program to perform the method of claim 1.

* * * * *